United States Patent [19]

Thompson-Rohrlich

[11] Patent Number: 5,500,937
[45] Date of Patent: Mar. 19, 1996

[54] METHOD AND APPARATUS FOR EDITING AN INKED OBJECT WHILE SIMULTANEOUSLY DISPLAYING ITS RECOGNIZED OBJECT

[75] Inventor: John Thompson-Rohrlich, Santa Fe, N.M.

[73] Assignee: Apple Computer, Inc., Cupertino, Calif.

[21] Appl. No.: 118,034

[22] Filed: Sep. 8, 1993

[51] Int. Cl.$^6$ .................................................. G06F 3/00
[52] U.S. Cl. ..................... 395/161; 395/155; 395/144; 395/153; 345/173; 382/309; 382/311
[58] Field of Search ........................... 382/309–311, 189; 395/155–161, 144–149, 153; 345/117–120, 173–183, 187; 364/560

[56] References Cited

U.S. PATENT DOCUMENTS

| | | | |
|---|---|---|---|
| 4,727,588 | 2/1988 | Fox et al. | 382/189 |
| 4,974,260 | 11/1990 | Rudak | 382/311 |
| 5,151,688 | 9/1992 | Tanaka et al. | 345/182 |
| 5,239,489 | 8/1993 | Russell | 364/560 |
| 5,315,667 | 5/1994 | Fujisaki et al. | 382/187 |
| 5,428,805 | 6/1995 | Morgan | 345/179 X |

OTHER PUBLICATIONS

"Guide to Pen Computing", Microsoft Corp., 1992.
"Using PenPoint" Developer Release Operators Manual for PenPoint Operating System, Go Corporation.

*Primary Examiner*—Mark R. Powell
*Assistant Examiner*—John E. Breene
*Attorney, Agent, or Firm*—Hickman & Beyer

[57] ABSTRACT

A method and apparatus for manipulating inked objects in a computer system includes the steps of displaying a first recognized object on a computer screen and displaying a first ink object on the screen which was previously recognized as the first recognized object. The first ink object is edited to create a second ink object, and the second ink object is recognized as a second recognized object. The first recognized object is then replaced with the second recognized object. The method also preferably includes a step of selecting the first recognized object, and the first ink object is displayed in response to the selection step. A preferred method of selecting the first recognized object is to move a stylus within a predetermined distance or bounding box of the first recognized object. Editing the first ink object preferably includes adding or deleting a portion of the ink object, inserting a space between characters of the ink object, replacing a portion of the ink object, and adding new ink to the ink object. Alternate embodiments include moving the recognized object to different locations on the screen in relation to the first ink object, and determining in advance if the path of the stylus in moving toward the bounding box of the recognized object. The method and apparatus of the present invention permits convenient and quick manipulation of inked objects and correction of recognized objects displayed on a pen computer system.

32 Claims, 12 Drawing Sheets

METHOD AND APPARATUS FOR EDITING AN INKED OBJECT WHILE SIMULTANEOUSLY DISPLAYING ITS RECOGNIZED OBJECT

BACKGROUND OF THE INVENTION

This invention relates generally to computer systems, and more particularly to graphical user interfaces for computer systems.

Graphical user interfaces or GUI are becoming increasingly popular with computer users. It is generally accepted that computers having graphical user interfaces are easier to use, and that it is quicker to learn an application program in a GUI environment than in a non-GUI environment.

A relatively new type of computer which is well suited for graphical user environments is the pen-based or pen-aware ("pen") computer system. A pen-based computer system is typically a small, hand-held computer where the primary method for inputting data includes a "pen" or stylus. A pen-aware computer system is one which has been modified to accept pen inputs in addition to traditional input methods. A pen computer system is often housed in a relatively flat enclosure, and has a dualfunction display assembly which serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus across the surface of the screen. A stroke can be defined as the engagement of the screen with a stylus, the movement of the stylus across the screen (if any), and its subsequent disengagement from the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion. Besides serving as a notepad, pen-based computers can provide a number of useful functions, such as serving as an address book, an appointment calendar, a to-do list, etc.

When using pen computers, a need often arises to edit recognized information that was originally "inked" on the screen by a stylus or other pointing device. Recognized information may include errors if recognition software running on the pen computer did not correctly recognize the inked characters or gestures. For example, a number "123" that is inked on the screen might mistakenly be recognized as "122" by the recognition software. In other situations, the user might wish to alter a previously entered character, gesture or word that has been recognized by the recognition software.

In many previous pen computers, a user changes recognized data by deleting the recognized data and re-entering a character, gesture or word, which is then rerecognized by the recognition software. This re-entering of data can be time-consuming and inefficient, especially when a long word or sentence is being re-entered. In other pen computer systems, a user can write over a recognized data image to replace it with new data. However, this can be awkward if the recognized data image is small or is too closely spaced to other displayed data to permit inked images to be easily entered.

In Pen Windows by Microsoft Corporation, recognized data can be edited by displaying the original inked data in a separate window as separate characters that are each within a box. An inked character can be edited within its box and the character is then re-recognized by the recognition software. However, this system can be awkward, since a separate, modal window must be displayed and the user cannot view the newly-recognized characters alongside the inked characters. Furthermore, the letters are constrained to specific fields, which is an artificial and awkward way to write.

What is needed is a utility program that allows the user to edit and correct inked gestures and words conveniently and quickly. The utility should be able to display the inked images concurrently with recognized images to facilitate ease of user corrections.

SUMMARY OF THE INVENTION

The method and apparatus of the present invention permits convenient and quick manipulation of inked objects displayed on a pen computer system. The invention permits straightforward correction of recognized data using the original ink that the user previously entered.

A method for editing a recognized object on the computer screen of the present invention includes the steps of displaying a first recognized object on a computer screen and displaying a first ink object on the screen which was previously recognized as the first recognized object. The first ink object is edited to create a second ink object, and the second ink object is recognized as a second recognized object. The first recognized object is then replaced with the second recognized object. The method also preferably includes a step of selecting the first recognized object, and the first ink object is displayed in response to the selection step. A preferred method of selecting the first recognized object is to move a stylus within a predetermined distance of a bounding box of the first recognized object. Editing the first ink object preferably includes adding or deleting a portion of the ink object, inserting a space between characters of the ink object, replacing a portion of the ink object, and adding new ink to the ink object. Alternate embodiments include moving the recognized object to different locations on the screen in relation to the first ink object.

A method for displaying information in a computer system includes the steps of displaying a recognized object on a screen of a computer system, selecting the recognized object, and displaying an original ink object at about its original entry position and in about its original configuration. The method also preferably includes selecting the recognized object by moving a pointing device within a predetermined distance of the recognized object, either within the plane of the computer screen or above the screen. An alternate embodiment determines in advance if the user appears to be approaching the recognized object. This alternate method includes steps of collecting points representing the path of the pointing device, calculating a weighted least squares line fit of the points, and selecting the recognized object when the fit line points towards the recognized object. The original ink object can also preferably be edited to create a second ink object, which is recognized as a new recognized object. The original recognized object is preferably replaced with the newly recognized object.

A computer system in accordance with the present invention includes a digital processor, memory coupled to the digital processor, a screen coupled to the digital processor, and a pointer device coupled to the digital processor for entering an ink object into the memory. The computer system further includes a mechanism for recognizing the ink object stored in the memory and for displaying a recognized object on the screen, a mechanism for selecting the recognized object, and a mechanism for displaying the ink object as entered into the memory on the screen in a substantially unaltered state. The recognized object is preferably recognized as alphanumeric characters or predefined gestures. The mechanism for selecting the recognized object preferably includes a mechanism for detecting when the pointing device is within a predetermined distance of the recognized object. The computer system also preferably includes a mechanism for editing the ink object to create a new ink object, recognizing the ink object as a new recognized object, and replacing the recognized object with the new recognized object.

The present invention allows quick entering and editing of data into a computer system using pointer-based inputs. Inked data is recognized, and may be edited quickly and conveniently by changing the original inked data with additional pointer-based inputs. Furthermore, the ability to view the original inked object at its original location and in its original configuration can be very helpful to users, particularly if they cannot figure out what the correct entry to the computer system should have been from the incorrectly recognized object.

These and other advantages of the present invention will become apparent upon a reading of the following descriptions and a study of the various figures of the drawing.

BRIEF DESCRIPTION OF THE DRAWINGS

FIGS. 4a–3c illustrate a portion of the display screen as shown in FIG. 2 showing an ink object and a recognized object;

FIGS. 4a–4c illustrate a portion of the display screen showing the deletion of the recognized object and the ink object;

FIG. 12b is a flow diagram illustrating an alternate embodiment of the flow diagram shown in FIG. 12a;

DETAILED DESCRIPTION OF THE PREFERRED EMBODIMENTS

The present invention is well suited for pointer based computer systems such as the pen-based, pen-aware and mouse-based systems that are: currently popular. For the purposes of illustration, the invention will be described in connection with a pen-based or pen-aware ("pen") system.

Figure 1:
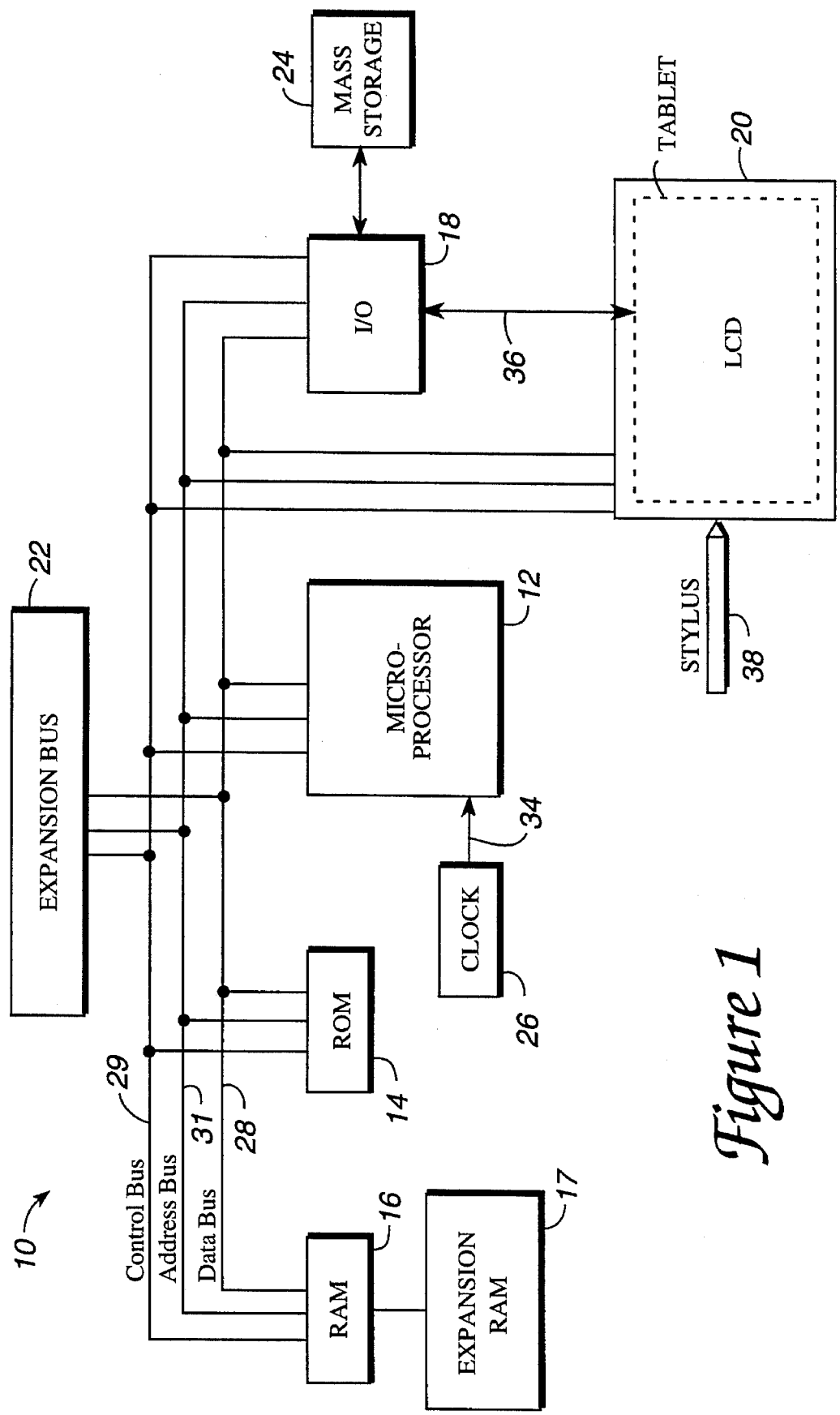
FIG. 1 is a block diagram of a pen computer system in accordance with the present invention.

As shown in FIG. 1, a pen computer system 10 in accordance with the present invention includes a central processing unit (CPU) 12, read only memory (ROM) 14, random access memory (RAM) 16, expansion RAM 17, input/output (I/O) circuitry 18, display assembly 20, and expansion bus 22. The pen computer system 10 may also optionally include a mass storage unit 24 such as a disk drive unit or nonvolatile memory such as flash memory and a real-time clock 26.

The CPU 12 is preferably a commercially available, single chip microprocessor, and is preferably a complex instruction set computer (CISC) chip such as the 68040 microprocessor available from Motorola, Inc. CPU 12 is coupled to ROM 14 by a data bus 28, control bus 29, and address bus 31. ROM 14 contains the basic operating system for the pen computer system 10. CPU 12 is also connected to RAM 16 by busses 28, 29, and 31 to permit the use of RAM 16 as scratch pad memory. Expansion RAM 17 is optionally coupled to RAM 16 for use by CPU 12. CPU 12 is also coupled to the I/O circuitry 18 by data bus 28, control bus 29, and address bus 31 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20 and mass storage 24.

Display assembly 20 of pen-based computer system. 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 can be a thin, clear membrane which covers the LCD display and which is sensitive to the position of a stylus 38 on its surface. Alternatively, the screens can be provided with an embedded RF digitizer and an "active" RF stylus. There are also other types of confirmation screen/tablet technologies. Combination display assemblies such as display assembly 20 are available from a variety of vendors.

Other types of user inputs can also be used in conjunction with the present invention. While the method of the present invention is described in the context of a pen system, other pointing devices such as a computer mouse, a track ball, or a tablet can be used to manipulate a pointer on a screen of a general purpose computer. Therefore, as used herein, the terms "pointer", "pointing device" and the like will refer to any mechanism or device for pointing to a particular location on a screen of a computer display.

Some type of mass storage 24 is generally considered desirable. However, the mass storage 24 can be eliminated by providing a sufficient amount of RAM 16 and expansion RAM 17 to store user application programs and data. In that case, RAMs 16 and 17 could be provided with a backup battery to prevent the loss of data even when the pen computer system 10 is turned off. However,, it is generally desirable to have some type of long term storage 24 such as a commercially available miniature hard disk drive, non-volatile memory such as flash memory, battery backed RAM, PCMCIA cards, or the like.

In operation, information is input into the pen computer system 10 by "writing" on the screen of display assembly 20 with the stylus 38. Information concerning the location of the stylus 38 on the screen of the display assembly 20 is input into the CPU 12 via I/O circuitry 18. Typically, this information comprises the Cartesian (i.e. x & y) coordinates of a pixel of the screen of display assembly 20 over which the tip of the stylus is positioned. Commercially available combination display assemblies include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 then produces data which is output to the display assembly 20 to produce appropriate images on its screen.

Expansion bus 22 is coupled to the data bus 28, the control bus 29, and the address bus 31, similar to the other components in system 10. Expansion bus 22 provides extra ports to couple devices such as modems, display switches, microphone, speaker, etc. to the CPU 12.

Figure 2:
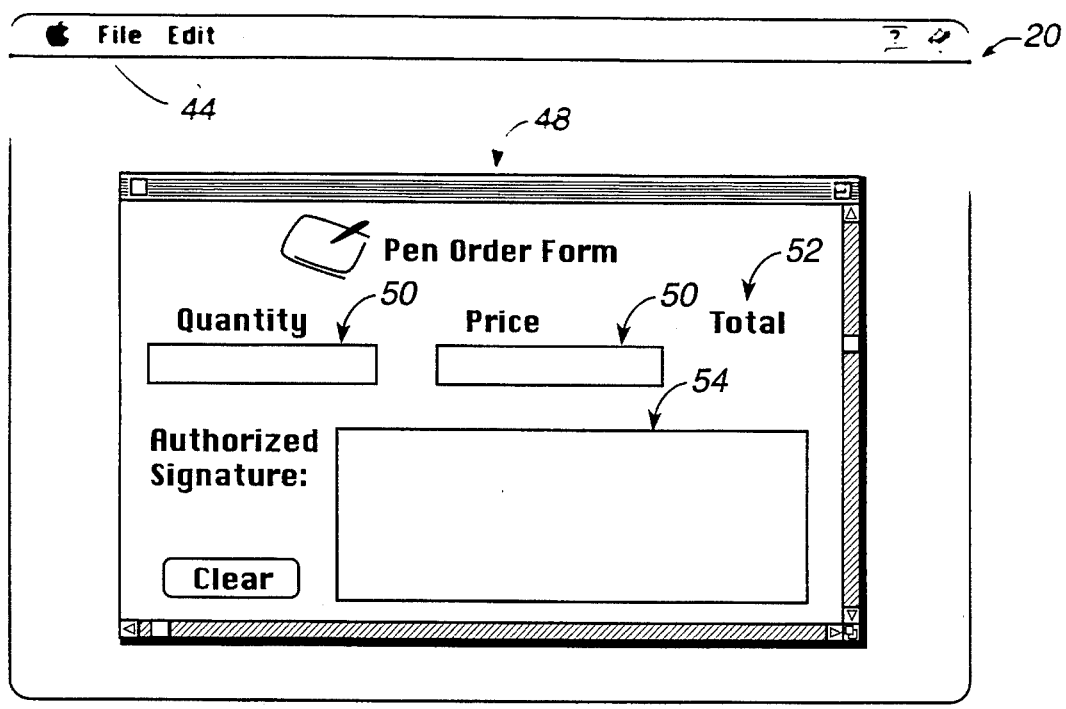
FIG. 2 is a display screen of the computer system of FIG. 1 showing an exemplary application window.

In FIG. 2, a display screen 20 of a computer system is shown. In the preferred embodiment, screen 20 is the LCD input/output display of the pen computer system shown in FIG. 1. A display from an Apple Macintosh System 7.0 operating system environment is shown as an example; however, arty user interface used on a computer capable of running such an environment is applicable to the present invention. Menu titles 44, when touched with a pointing device, display pull-down menus, which include selections that can be activated with the pointing device.

Window 48 is displayed by a currently active application program. As referenced herein, "application program" refers to programs such as word processors, spreadsheets, drawing programs, utilities, etc. that can run on the computer system. In the described embodiment, window 48 is displayed by a database application program that organizes, stores, and retrieves data for a user. For example, window 48 can be displayed by an "order form" program, which tabulates quantity and price for an ordered item, and outputs the total price. In FIG. 2, window 48 includes price and quantity input fields 50 which are receptive to pointer device inputs. A user can use, for example, a stylus to write or draw "ink" in or near an input field 50. The ink is preferably in the form of characters (e.g. English or foreign letters, numbers, etc.) and those characters are recognized by recognition software and displayed as printed characters preferably in input field 50 (described subsequently). The total price (quantity times price) is calculated from the recognized characters and displayed in the "total" area 52. The user may also write a signature in input field 54 with a pointing device. The signature can be recognized as characters by the recognition software and printed below the displayed ink. In other application programs, a user can enter rough graphical shapes, such as circles, squares, triangles, etc. The application program then recognizes the standard shapes, cleans up the shapes and displays corresponding regular, straight lined shapes.

Figure 3A:
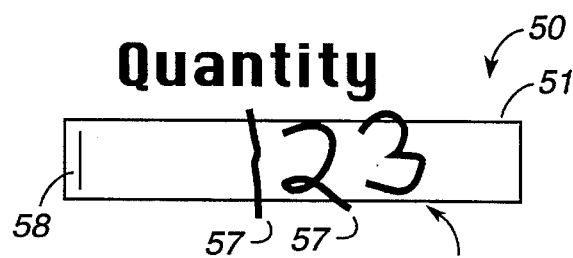
FIGS. 3a–3c illustrate a portion of the display screen as shown in FIG. 2 showing an ink object and a recognized object.

In FIG. 3a, a detailed view of an input field 50 is shown. Ink object 56 includes "inked" strokes that have been drawn using a pointing device in input field 50. Typically, ink object 56 is written by contacting a stylus to the screen 20 and moving the stylus in a desired direction. The CPU 12 displays the ink along the path of the stylus as the stylus is moved. The stylus is removed from the screen 20 and placed on the screen at a nearby location to draw the next stroke. In an alternate embodiment, ink object 56 is written using a stylus on a separate tablet in place of the screen. The tablet acts as the screen for written inputs in such an embodiment. In an alternate embodiment, ink object 56 is written using a mouse or trackball pointing device. The ink strokes are drawn by pressing a button on the mouse or track ball and releasing the button to display an arrow or other indicator indicating where the mouse or track ball is currently pointing.

In the preferred embodiment, ink object 56 does not necessarily have to be written entirely within the outline 51 of input field 50. Preferably, the user starts writing within outline 51 and may then continue writing inside or outside input field 50. When the user stops writing for a predetermined period of time (i.e. after a "timeout"), the CPU assumes the user has finished entering strokes and begins to process ink object 56. In another embodiment, outline 51 showing the .input field 50 is invisible to the user, and ink object 56 is written in a general area of input field 50.

In the preferred embodiment, ink object 56 includes one or more distinct characters 57. Individual characters 57 can also be considered individual "ink objects" for the purposes of the present invention. Characters 57 most typically include alphanumeric characters, such as numbers, letters, and punctuation (decimal points, commas, etc.). Gestures may also be entered in input field 50. Gestures include a distinctive shape or symbol that is recognized as a pre-defined character or as a command. For example, a particular shape, when recognized, can instruct the CPU 12 to print a preprogrammed word, or delete a specific character.

In another embodiment, graphical shapes can be entered by the user instead of text characters or gestures. A single graphical shape can be considered an ink object similar to ink object 56.

Characters 57 typically have surrounding borders that are known as bounding boxes. A character's bounding box conforms generally to the shape of the character. In many instances, a bounding box is the minimum rectangle enclosing an object, and in other instances the bounding box may be smaller or larger than the object. Bounding boxes are often invisible to a user. For example, a "1" character has a thin, rectangular bounding box encompassing the "1", while a "2" character has a roughly squareshaped bounding box surrounding the character. The entire ink object 56 also includes a larger bounding box enveloping all of the characters of the object 56.

Cursor 58 preferably shows where recognized characters are printed by the CPU. In an alternate embodiment, cursor 58 is not shown and recognized characters are printed in a predetermined location on screen 20.

Figure 3B:
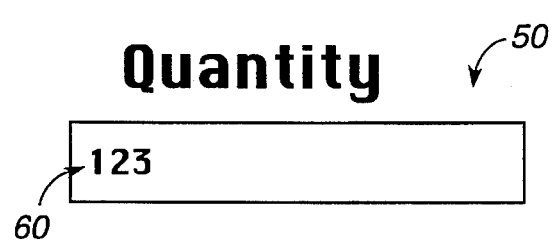

FIG. 3b shows input field 50 after the ink object 56 has been recognized by recognition software. When the user lifts the pointing device from the input field 50 and does not contact the screen for a predetermined period of time, the CPU 12 assumes that the user has finished entering strokes. The CPU preferably attempts to recognize ink object 56 as alphanumeric characters or predefined gestures. Preferably, the CPU stores the data describing ink object 56 into RAM 16, where it can be accessed when required. In an alternate embodiment, shapes such as circles, squares, etc. can also be recognized. Recognition software for recognizing such characters, gestures, etc. are well-known to those skilled in the art.

Once the recognition software has recognized the ink object, the CPU 12 preferably displays a recognized object 60 in or near input field 50. As recognized object 60 is displayed, ink object 56 is preferably removed from screen 20. Recognized object 60 includes the individual recognized characters 57 (and gestures, if appropriate) that were included in ink object 56. Ink object 66 may be recognized by the CPU 12 as an entire number, word, or sequence of individual characters, depending on the recognition software functionality. For example, the inked characters "123" were written by the user in FIG. 3a, and were recognized by the CPU and printed as the number 123 in FIG. 3b. If the inked strokes were recognized as a gesture instead of characters, then the CPU 12 performs actions according the recognized gesture. In the preferred embodiment, the recognition software will always try to recognize ink object 56; if the ink object cannot be readily recognized, the software will "guess" what the ink object might be by using a list of similarly-shaped characters and words.

Figure 3C:
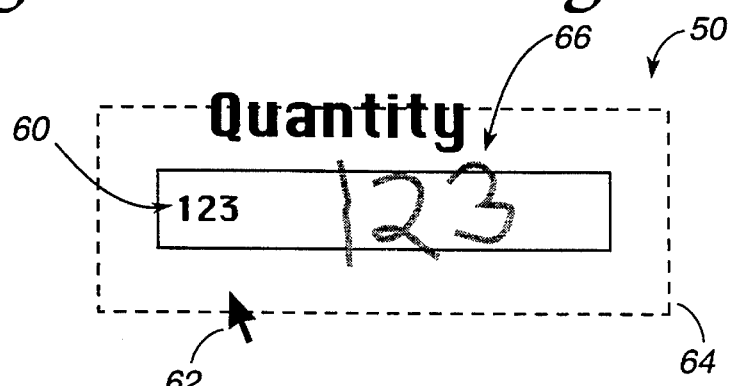

FIG. 3c shows input field 50 when a pointing device is pointing close to the input field. Arrow 62 shows the location where a pointing device is currently pointing. For a stylus, arrow 62 is preferably displayed when the stylus is brought within a specific distance above screen 20 but is not contacting the screen 20, i.e. the stylus is "pointing". Arrow 62 is displayed unless the stylus contacts the screen and draws ink, i.e. the stylus is "inking". For a mouse or track ball device, arrow 62 is displayed and the mouse or track ball is pointing until a button is pressed on the mouse or track ball to cause the device to start inking on the screen. Other pointing indicators or shapes besides arrow 62 can be used to show where a pointing device is currently pointing.

In FIG. 3c, arrow 62 is positioned within a bounding box 64, which is preferably invisible to the user. Bounding box 64 is preferably associated with recognized object 60 and is positioned relative to the recognized object in a predetermined location; typically, bounding box 64 is positioned surrounding recognized object 60 as shown in FIG. 3c, the edges of bounding box 64 being a predetermined distance from recognized object 60. In the preferred embodiment, if arrow 62 is positioned inside bounding box 64, original ink object 56 is displayed in about the same location in which it was written. Original ink object 56, however, is now displayed as entered ink object 66. Preferably, entered ink object 66 is slightly different in appearance than ink object 56 to indicate that the ink object was written previously; for example, entered ink object 66 could be displayed in a different color, as shown in FIG. 3c.

While ink object 66 is displayed, ink object 66 may preferably be edited, i.e. new ink strokes may be entered in input field 50 that will preferably edit or affect recognized object 60 (described subsequently). New ink strokes are entered in standard fashion by contacting a stylus to the screen or selecting a button on a pointing device. If arrow 62 is moved outside of bounding box 64, ink object 66 is removed from screen 20 and any new ink strokes entered by the user while arrow 62 is outside the bounding box will not affect recognized object 60. In this fashion, a recognized object is "selected" for editing if arrow 62 is positioned within bounding box 64 because ink object 66 is displayed and new ink strokes can be entered to edit recognized object 60. Similarly, moving arrow 62 outside of bounding box 64 "de-selects" recognized object 60.

In an alternate embodiment, bounding box 64 can be displayed on screen 20 as a reference for the user when entered ink object 66 is displayed and removed from screen 20 when ink object 66 removed. Bounding box 64 can preferably be set by the user to be visible or invisible. The location of bounding box 64 with reference to recognized object 60 can also be set by the user in a different embodiment. For example, the distance from the center of recognized object 60 to an edge of bounding box 64 can be user-selected. In other embodiments, recognized object 60 is selected in response to different user inputs. For example, entered ink object 66 could be displayed when recognized object 60 is highlighted or touched directly by the pointing device, and removed from the display once the pointing device is removed. Or, the user could push a button or select a menu option to select recognized object 60 and cause ink object 66 to be displayed on the screen.

Figure 4A:
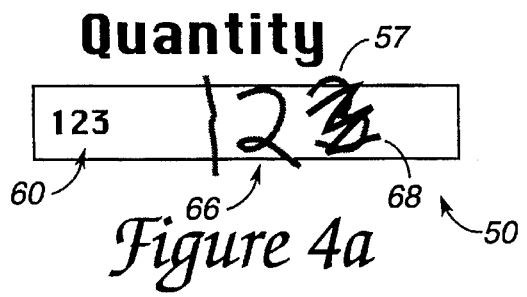

In FIG. 4a, input field 50 is displayed, including recognized object 60 and entered ink object 66. Ink object 66 is shown edited with a scrub gesture 68, which is formed from new ink strokes entered by a pointing device. The new ink strokes are entered after ink object 66 has been recognized as recognized object 60. The user enters the scrub gesture, and, when a delimiter occurs, the CPU assumes the user is finished editing the ink object 66 and attempts to recognize the strokes. In the preferred embodiment, the delimiter is a timeout, i.e. the CPU waits a predetermined period of time after the user has entered strokes before processing the strokes. In an alternate embodiment, the delimiter can be a distance: when the user moves the pointing device a predetermined distance away from the recognized (or inked) object, the CPU assumes the editing is complete.

Scrub gesture 68 is a predefined gesture that, when recognized, will delete objects it overlays. Scrub gestures are discussed in co-pending patent application 08/070,094 by Capps et al., filed on May 27, 1993 and assigned to the same assignee of the present invention, which is hereby incorporated by reference herein. Ink strokes each preferably have individual bounding boxes, similar to the bounding boxes of characters described with reference to FIG. 3a. Once the new ink strokes in FIG. 4a have been recognized as a scrub gesture, the scrub gesture is assigned an overall bounding box. FIG. 4a shows the scrub gesture 68 overlaying a single character 57 of ink object 66, the character "3"; i.e., the bounding box of the scrub gesture intersects the bounding box of the "3" character. The deletion of characters using a scrub gesture is detailed with reference to FIG. 15.

Figure 4B:
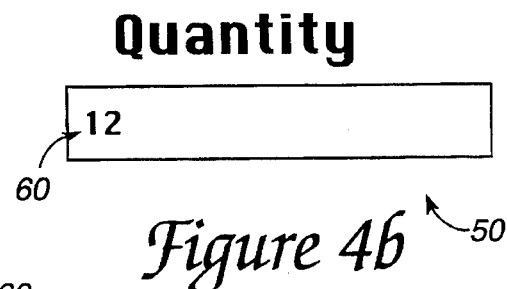

FIG. 4b shows input field 50 after the scrub gesture of FIG. 4a has been recognized and implemented. The CPU deletes all characters from ink object 66 which scrub gesture 68 overlays. The edited ink object 66 is now considered a new ink object and recognized. For example, in FIG. 4*a* the "3" character was deleted from ink object 66. The edited ink object, "12", is considered a new ink object and is recognized as 12. The new recognized object 60 ("12") is displayed in input field 50 and the new ink object is removed from the screen as shown in FIG. 4*b*.

Figure 4C:
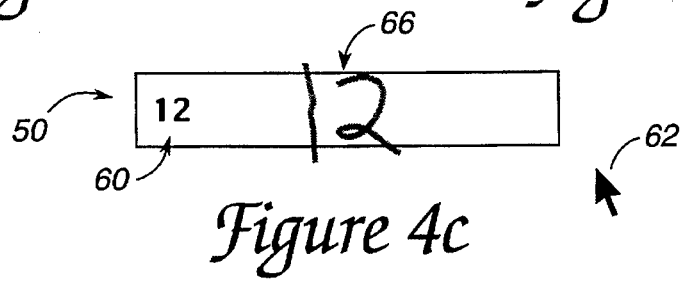

FIG. 4*c* shows input field 50 and arrow 62 positioned within bounding box 64 (not shown). The new, edited ink object ("12") is now displayed as ink object 66 whenever arrow 62 is brought within bounding box 64.

Figure 5A:
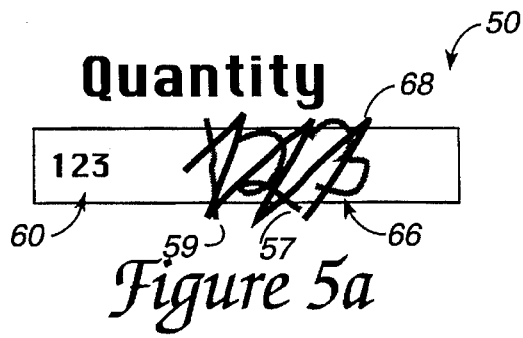
FIGS. 5a and 5b illustrate a portion of the display screen showing the deletion of a single character of the recognized object and the ink object.

FIG. 5*a* shows input field 50 displayed, including recognized object 60 and ink object 66. The user has entered new ink strokes as a scrub gesture 68 that overlays all characters 57 of ink object 66, i.e. the bounding box of scrub gesture 68 intersects the bounding boxes of all characters 57.

Figure 5B:
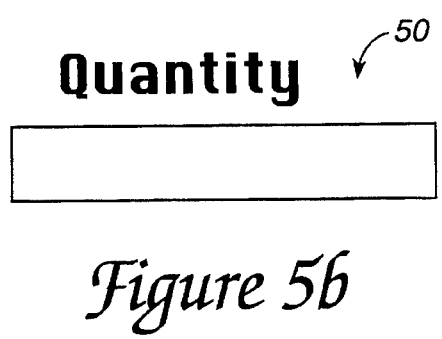

FIG. 5*b* shows input field 50 after the scrub gesture of FIG. 5*a* has been recognized and implemented. The CPU deletes all characters that the scrub gesture overlays. Thus, the edited ink object from FIG. 5*a* is a "null" object, since all characters have been deleted. The CPU sends the null object to the recognition software, which recognizes the null and deletes recognized object 60. FIG. 5*b* shows recognition object 60 deleted and removed from the screen 20. Bounding box 64 is preferably deleted with recognized object 60.

Figure 6A:
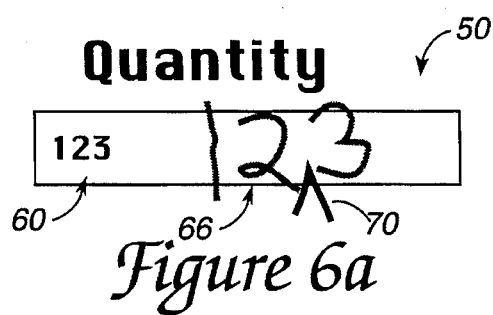
FIGS. 6a–6d illustrate a portion of the display screen showing the insertion of a single character into the recognized object.

FIG. 6*a* shows input field 50 displayed, including recognized object 60 as the number "123" and entered ink object 66 as the numbers "123". The user has entered new ink strokes in the shape of a carat punctuation mark 70. In the preferred embodiment, if the carat 70 is placed in a specific position relative a character 57 of ink object 66, it will be recognized as an insert gesture that inserts a space between two characters (described with reference to FIG. 15). For the purposes of this invention, multiple small strokes that intersect, such as two strokes that form a number "4", are together recognized as one character 57 of ink object 66 and will not be separated by a gesture such as carat 70.

Figure 6B:
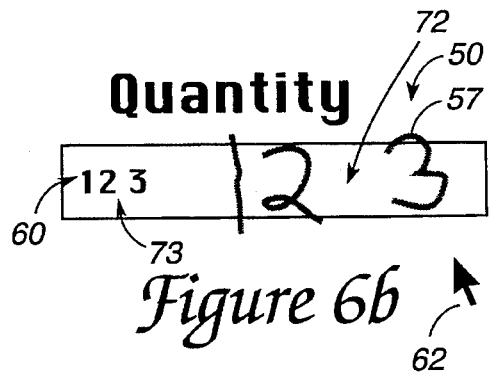

In FIG. 6*b*, the carat 70 of FIG. 6*a* has been recognized as an insert gesture. In the preferred embodiment, the characters 57 of ink object 66 positioned to the right of the carat 70 are moved to the right a predetermined distance to create a space 72 between the strokes of ink object 66. The edited ink object with the new space 72 is then re-recognized by the recognition software and recognized object 60 is updated with a space 73. For example, in FIG. 6*b* the edited ink object 66 includes a "3" character that has been moved to the right to create a space 72 between the "2" character and the "3" character. Space 73 has correspondingly been inserted between the "2" and the "3" of recognized object 66. Carat 70 is preferably removed from the screen once the space 72 has been inserted.

Figure 6C:
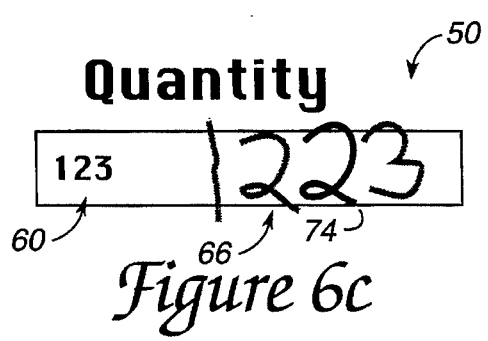
Figure 6D:
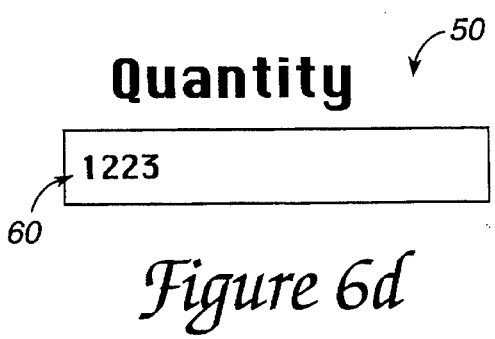

In FIG. 6*c*, the user has entered a new ink stroke 74 onto space 72; in this example, the new ink stroke 74 is shaped like the number "2". In FIG. 6*d*, the CPU has added new ink stroke 74 to ink object 66 to create a new ink object that includes all ink, and has sent the new ink object to the recognition software. The recognition software has re-recognized the new ink object as recognized object 60; the space 73 of FIG. 6*b* has been replaced with a newly-recognized character. For example, the new ink stroke "2" entered on the space 73 of ink object 66 has caused the CPU to combine all the ink into a new ink object and recognize the new ink object as the number "1223". The new recognized object 60 is displayed in input field 50 replacing the old recognized object.

Figure 7A:
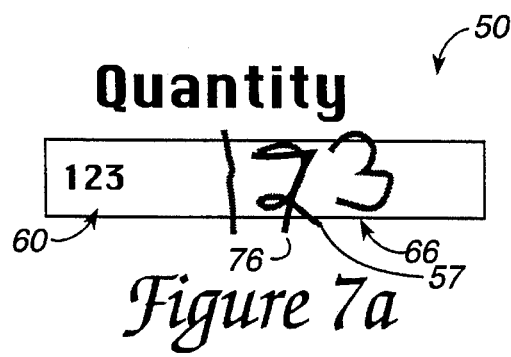
FIGS. 7a and 7b illustrate a portion of the display screen showing the replacing of a character with a new character n the recognized object.
Figure 7B:
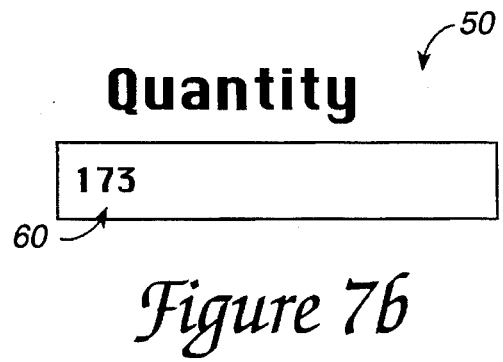

FIG. 7*a* shows input field 50, recognized object 60, and ink object 66. The user has entered a new ink stroke 76 over a character 57 of ink object 66. For example, in FIG. 7*a* the user has entered a new stroke 76 shaped like the number "7" over the character "2" of ink object 66. The CPU first checks if the new stroke 76 is a gesture. If the new stroke is not a gesture, the CPU replaces any characters overlaid by the new stroke 76 with the new stroke 76. For example, the old character "2" is replaced with the new stroke "7" to create a new ink object reading "173". In FIG. 7*b*, the CPU sends the new ink to the recognition software and the new ink is recognized. Recognized object 60 is displayed in FIG. 7*b* as "173" with ink object 66 removed from the screen. When arrow 62 is brought within bounding box 64 (not shown), the new, edited ink object 66 ("173") will be displayed.

Figure 8A:
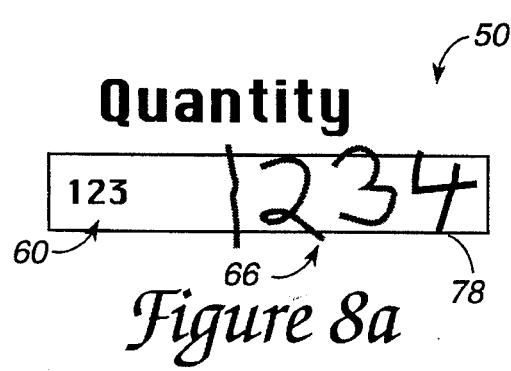
FIGS. 8a and 8b illustrate a portion of the display screen showing the addition of a character at the end of the recognized object.
Figure 8B:
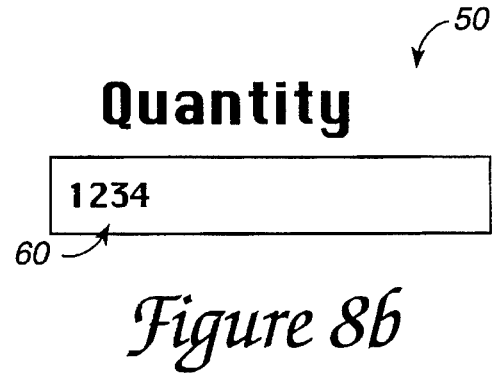

FIG. 8*a* shows input field 50, recognized object 60, and ink object 66. The user has entered a new ink stroke 78 at the far right end of ink object 66. The CPU adds the new stroke 78 to ink object 66 to create a new, edited ink object, and sends the new ink object to the recognition software. In FIG. 8*b*, the new ink object is recognized and displayed as recognized object 60 in place of the old recognized object. For example, a stroke "4" was entered at the end of the entered object "123", and all of the ink was re-recognized as the number 1234. A user can also enter a new ink stroke at the beginning (far left end) of entered ink object 66 and change the recognized object 60 in a corresponding fashion.

Figure 9A:
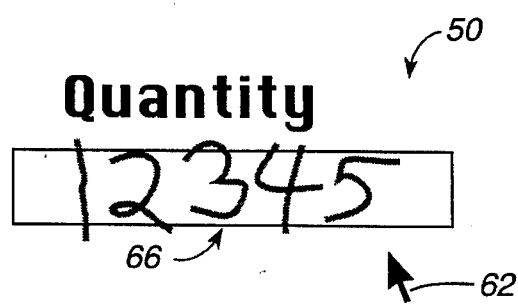
FIGS. 9a–9c illustrate a portion of the display screen showing an alternate embodiment of the present invention.
Figure 9B:
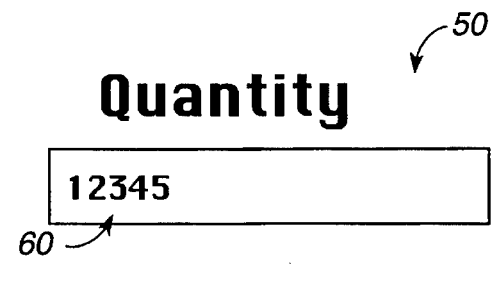
Figure 9C:
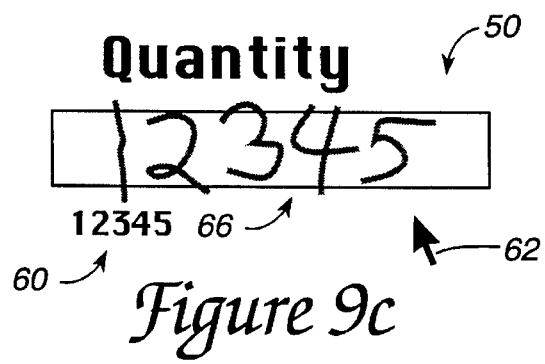

FIGS. 9*a*–9*c* show an alternate embodiment of the present invention. FIG. 9*a* shows input field 50 and ink object 66 before the ink object has been recognized by the recognition software. FIG. 9*b* shows recognized object 60 displayed in input field 50 with ink object 66 removed from the screen. FIG. 9*c* shows ink object 66 displayed when arrow 62 is brought within bounding box 64. Recognized object 60 has been moved a predetermined distance below ink object 66. Thus, each time that ink object 66 is displayed, recognized object 60 is displaced so that object 60 and/or object 66 do not intersect and are not obscured by each other. In the preferred embodiment, the user can set a preference so that recognized object 60 is displaced only when ink object 66 and recognized object 60 intersect; or, a preference can be set so that recognized object 60 is always displaced when ink object 66 is displayed. Of course, recognized object 60 can also be moved above, to the side, etc. of ink object 66, or even to a separate displaying area at a different section of screen 20.

Figure 10A:
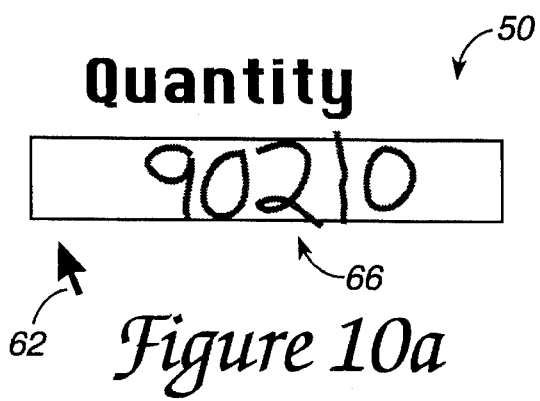
FIGS. 10a–10c illustrate a portion of the display screen showing an alternate embodiment of the present invention.
Figure 10B:
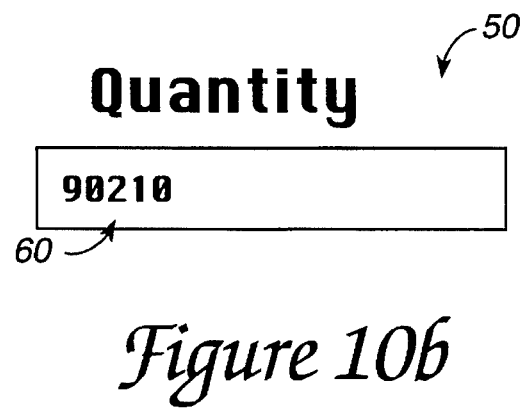
Figure 10C:
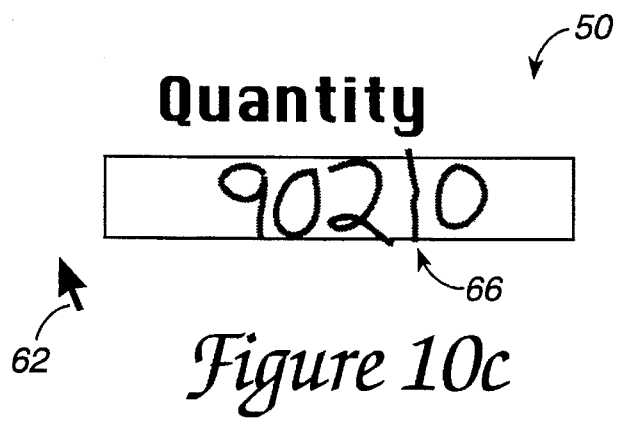

FIGS. 10*a*–10*c* show an alternate embodiment of the present invention. FIG. 10*a* shows ink object 66 within input field 50. FIG. 10*b* shows recognized object 60 within input field 50, while ink object 66 has been removed from the screen. FIG. 10*c* shows arrow 62 brought back within bounding box 64. Ink object 66 is visible, but recognized object 60 has been removed from the screen. Thus, each time that ink object 66 is displayed, recognized object 60 is removed from the screen. Once the arrow 62 is brought out of bounding box 64, recognized object 60 is displayed while ink object 66 is removed.

Figure 11:
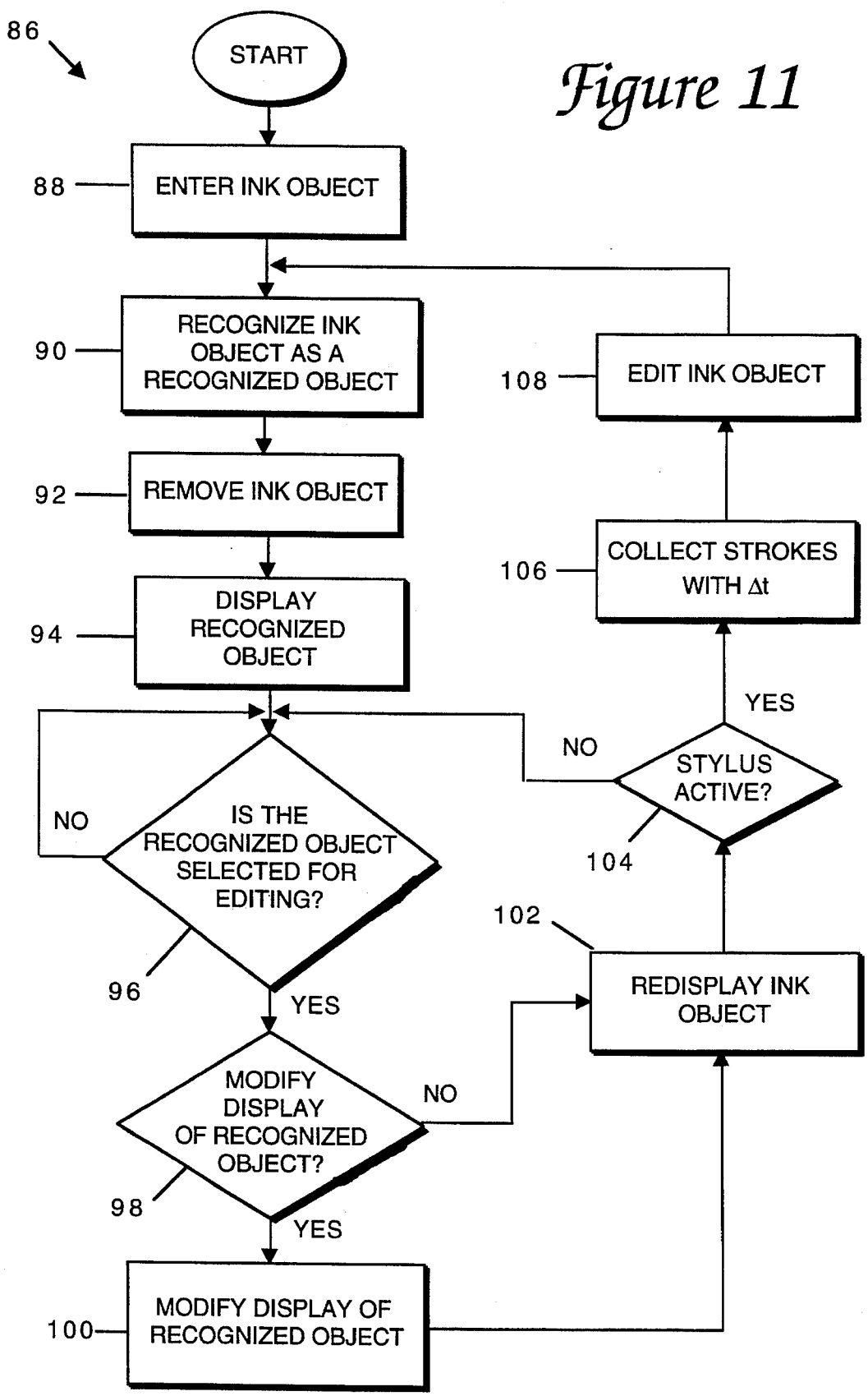
FIG. 11 is a flow diagram illustrating a computer implemented process of the present invention.

FIG. 11 is a flow diagram 86 of a preferred computer-implemented process in accordance with the present invention. In a first step 88, an ink object is entered by the user. This is accomplished, in the preferred embodiment, by contacting a stylus with the screen. In step 90, the ink object is recognized as a recognized object when a predetermined period of time has elapsed after the last stroke of the ink object has been entered. In step 92, the ink object is preferably removed from the screen. In step 94, the recognized object is preferably displayed near where the ink object had been entered.

Figure 12A:
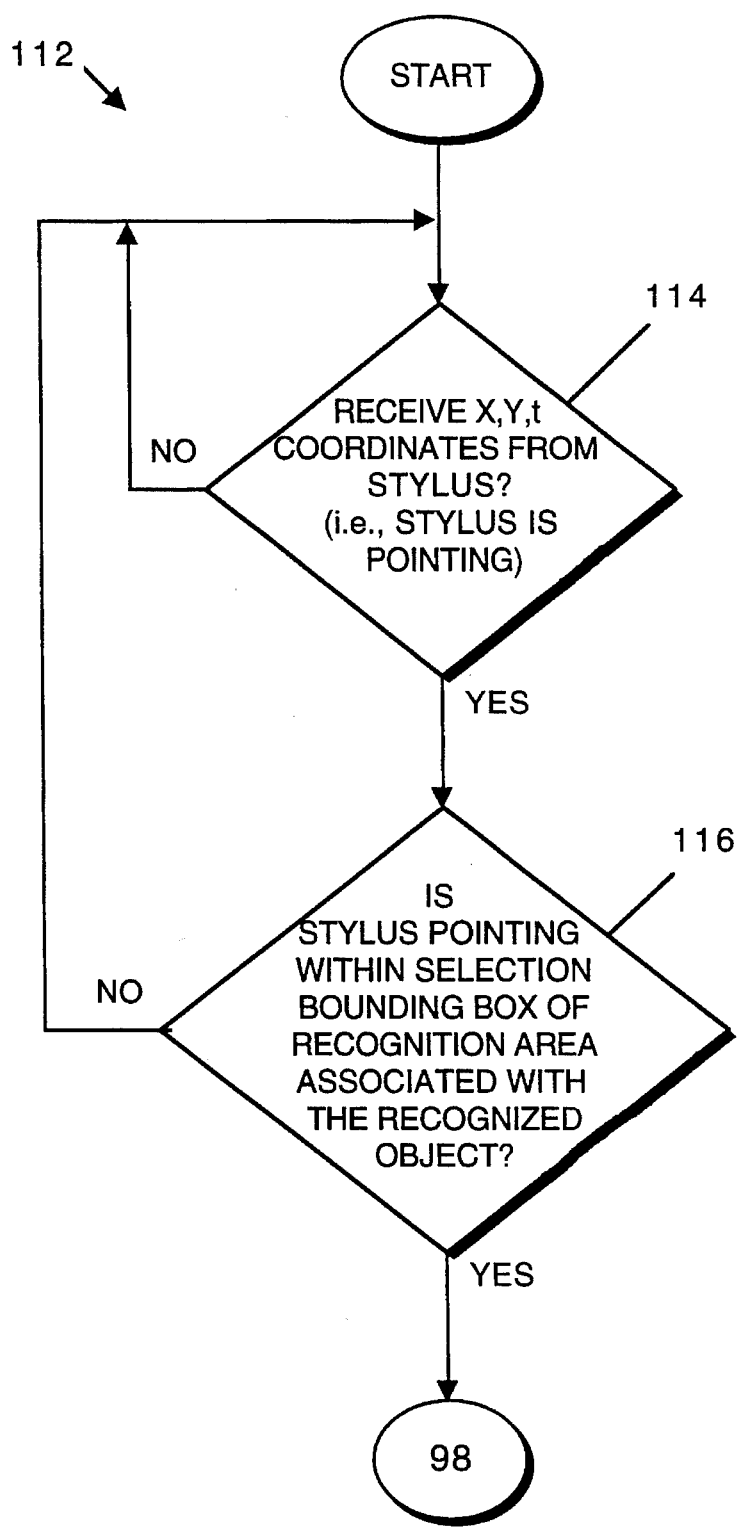
FIG. 12a is a flow diagram illustrating the "Is the Recognized Object Selected for Editing?" step of FIG. 11.
Figure 12B:
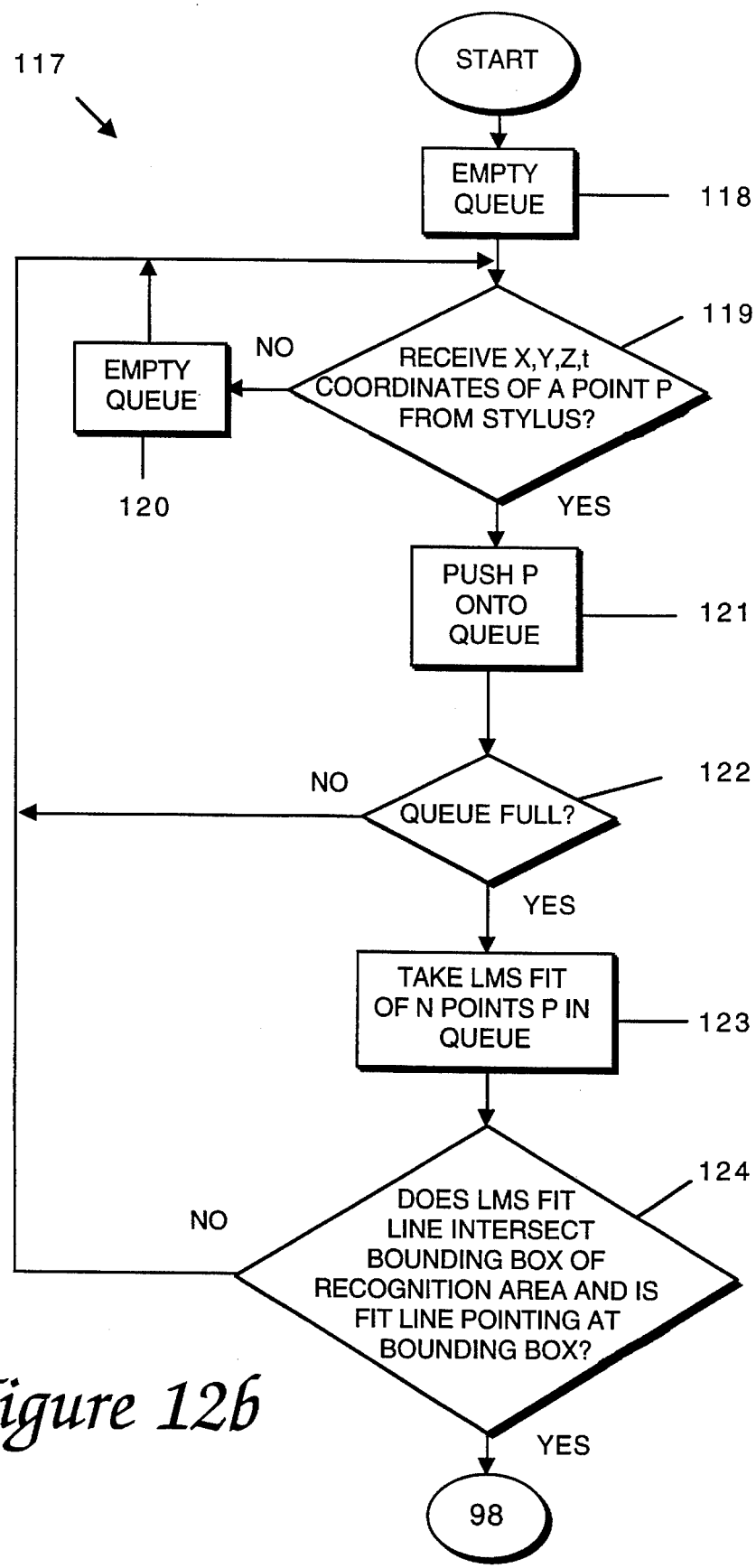
Figure 12C:
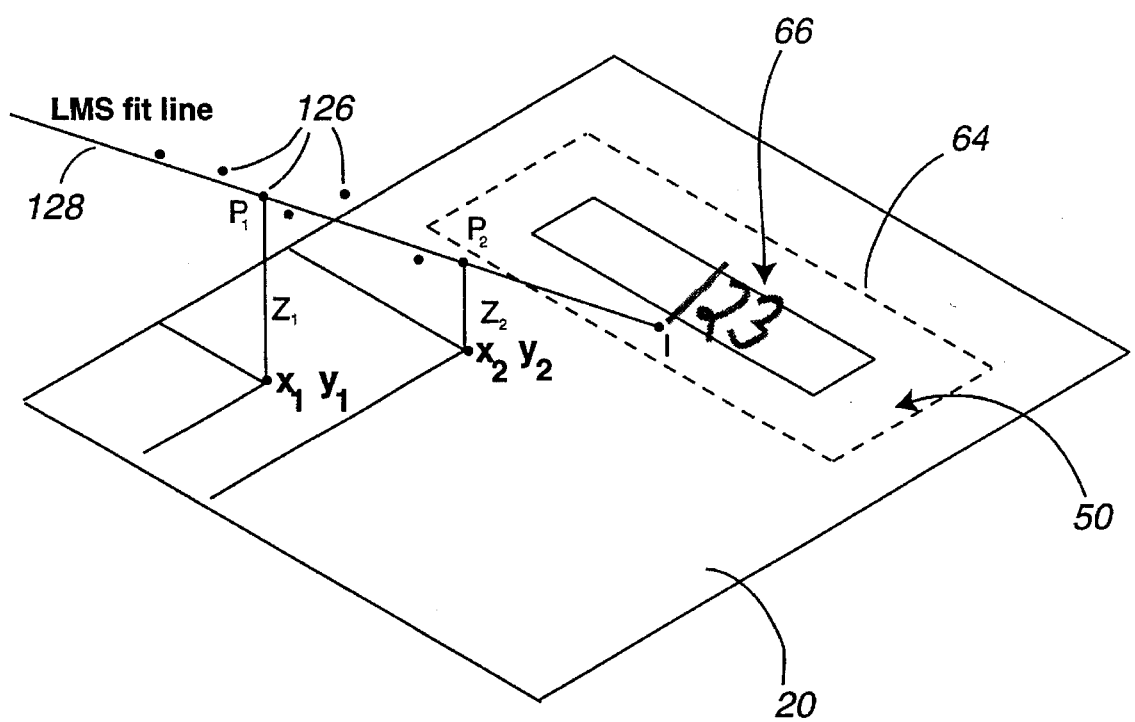
FIG. 12c is a pictorial diagram used to help describe the process illustrated in FIG. 12b.

In step 96, the CPU 12 checks if the displayed recognized object is being selected for editing. A preferred method to determine if the recognized object is being selected is shown in FIG. 12*a* and illustrated in FIG. 3*c*; an alternate method is shown in FIGS. 12*b* and 12*c*. If the recognized object is not being selected for editing, the process loops back to the present step 96 and continues to check for the selection. If the recognized object is selected for editing, the process flows to step 98.

In step 98, the CPU checks whether to modify the display of the recognized object. In the preferred embodiment, the user may select how the recognized object may be displayed. This step is detailed further with respect to FIG. 13. If the display of the recognized object is to be modified, the process goes to step 100. If the display of the recognized object is not to be modified, the process goes to step 102.

In step 100, the display of the recognized object is modified, i.e. the recognized object is moved a predetermined distance from its old location, as shown in FIGS. 9*a–c*; or, the recognized object is removed from the screen when the ink object is displayed, as shown in FIGS. 10*a–c*. Once the display of the recognized object is modified, the process flows to step 102.

In step 102, the ink object is redisplayed preferably at the same location on the screen that it was displayed at previously. In step 104, the CPU 12 checks if the stylus (or other pointing device) is active. The stylus is considered "active" when it is drawing ink on the screen; i.e. contacting the screen. If the stylus is not active, the process loops back to step 96, in which the recognized object is checked if it has been selected for editing. If the stylus is active, step 106 is initiated. In step 106, the new ink strokes are collected by CPU 12 according to the path of the pointing device, and, in step 108, the ink object 66 is edited in accordance with the new ink strokes, i.e. if the new ink strokes form a scrub gesture for deleting part of the recognized object, or if the new ink strokes form a new character, then the ink object 66 is edited accordingly. Step 108 is detailed with reference to FIG. 14. Once step 108 is completed, the CPU sends the new, edited ink object to step 90, where the new ink object is recognized including any new ink strokes.

FIG. 12*a* is a flow diagram 112 illustrating a preferred method of implementing step 96 of FIG. 11. In a step 114, CPU 12 checks if it is receiving x, y, and t coordinates from the stylus (or other pointing device). These coordinates indicate that the stylus is pointing at a particular location on the screen, i.e. arrow 62 (FIG. 3*c*) is displayed. The x and y values are the horizontal and vertical coordinates, respectively, on screen 20. The t coordinate represents the time measured from a predetermined reference, and is not specifically used in this embodiment. If coordinates are not being received, the process loops back and continues checking for coordinates at step 114. If coordinates are being received, the process continues to step 116. In step 116, the stylus (as determined by the coordinates x, y, and t) is checked if it is pointing within the selection bounding box 64 associated with the recognized object 60. If the stylus is not pointing within the bounding box, the process loops back to step 114 and continues to check for coordinates from the stylus. If the stylus is within the bounding box, the recognized object has been selected for editing and the process continues to step 98.

FIG. 12*b* is a flow diagram 117 illustrating an alternate embodiment of step 96 of FIG. 11. In step 118, a queue (having N storage locations) is emptied of data. In step 119, CPU 12 checks if it is receiving a point P from a stylus, the point having x, y, z, and t coordinates. The x and y coordinates represent horizontal and vertical distances, respectively, on screen 20. The z coordinate represents the distance from the plane of the screen to a point above the screen. The t coordinate represents the time measured from a predetermined reference. If the CPU is not receiving these coordinates, then the stylus is not within range to be detected, and step 120 is implemented. The queue is emptied in step 120 and the CPU continues to wait for coordinates at step 119. If the CPU is receiving coordinates in step 119, arrow 62 is preferably being displayed on the screen. In step 121, the point P is pushed onto the queue to be stored. In step 122, the CPU checks if the queue is full. The queue preferably has N locations in which to store points. In the preferred embodiment, N is equal to 5; in alternate embodiments, N can preferably vary from 3 to 7. If the queue is not full, the process loops back to step 119, which checks if another point has been received. If the queue is full, the CPU has collected at least N points, and the process continues at step 123. In step 123, the CPU preferably calculates a weighted least mean squares (LMS) line fit of the N points P stored in the queue. LMS calculations are well known to those skilled in the art. Here, a "weighted" LMS calculation indicates that more recently-received points are given more weight in the line calculation In step 124, the CPU checks if the LMS fit line intersects the bounding box of the recognized object and also preferably checks if the fit line is pointing at the bounding box, i.e. if coordinates received at a later time are closer to the bounding box (see FIG. 12*c*). If both the conditions are not met, the process loops back to step 119 to receive coordinates from another point. If both the conditions are met, the process continues to step 98 of FIG. 11.

The received points represent the path of the stylus moving near or on the screen. The fit line represents an approximately linear section of the path, and the direction and destination of the stylus can be reasonably guessed by the CPU from this line. The method of flow diagram 117 stores N points in the queue and fits a line to those N points. If the fit line does not intersect the bounding box, a new point is received from the stylus and the oldest stored point is discarded out of the other end of the queue. Thus, a fit line is constantly being calculated as new points are being received and collected. The time interval between each received point determines how accurate a line fit to those points is; the smaller the time interval, the more accurate the representation of the path of the stylus. The time interval between points should not be too long or an inaccurate line will be fit to the points. In the preferred embodiment, a line is fit to 5 points at one time, with 6.67 milliseconds elapsing between each point received(a rate of 150 points/second). The receiving rate of points can preferably vary from 100 to 250 points/second.

FIG. 12*c* is a diagram illustrating the process described in FIG. 12*b*. A portion of screen 20 is shown with input field 50 and bounding box 64. Points 126 are received and stored by the CPU, each point having x, y, z and t coordinates. For example, point P1 has x and y coordinates on screen 20 and a vertical z coordinate z1. LMS fit line 128 is fitted to N of the points 126 and intersects the screen 20 at a point I within bounding box 64. If point P2 is collected at a later time than point P1, then line 128 is pointing at bounding box 64. Using the method illustrated in FIGS. 12*b* and 12*c*, the CPU can determine if the stylus is moving toward bounding box 64 and thus reasonably predict if the user wishes to select and edit the recognized object. If a selection is predicted, the CPU displays ink object 66, even before the stylus is detected within bounding box 64.

Figure 13:
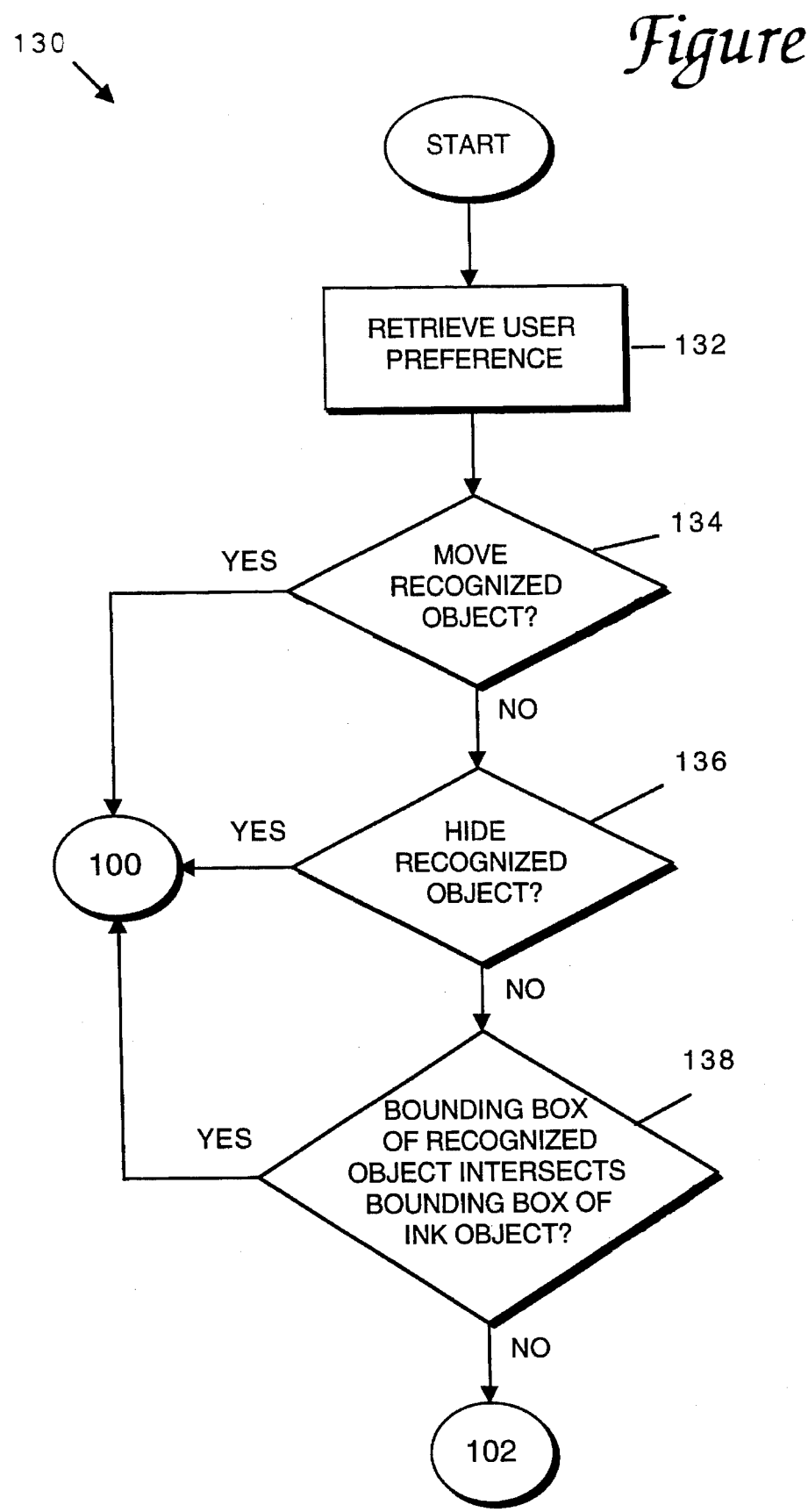
FIG. 13 is a flow diagram illustrating the "Modify Display of Recognized Object?" step of FIG. 11.

FIG. 13 is a flow diagram 130 illustrating step 98 shown in FIG. 11. In a first step 132, the user preference is retrieved by CPU 12. The user preference can preferably be set to one of three options: 1) move the recognized object 60 when ink object 66 is displayed; 2) hide the recognized object 60 when ink object 66 is displayed; and 3) move recognized object 60 only when ink object 66 intersects the recognized object. Other variations can, of course, also be used in other embodiments. In step 134, the CPU checks if the user has selected to move the recognized object every time ink object 66 is displayed. If so, the process proceeds to modify the recognized object as shown in step 100 of FIG. 11. If the user has not selected to move recognized object 60, the process continues to step 136, in which the CPU checks if the user has selected to hide the recognized object when ink object 66 is displayed. If so, the process continues to step 100 of FIG. 11. If not, the process continues to step 138, in which the CPU checks if the bounding box of the current recognized object intersects the bounding box of ink object 66. If so, the process continues at step 100 of FIG. 11. If not, the process continues to step 102 of FIG. 11. Of course, the multiple decision steps 134, 136, and 138 can also be handled concurrently with appropriate software.

Figure 14:
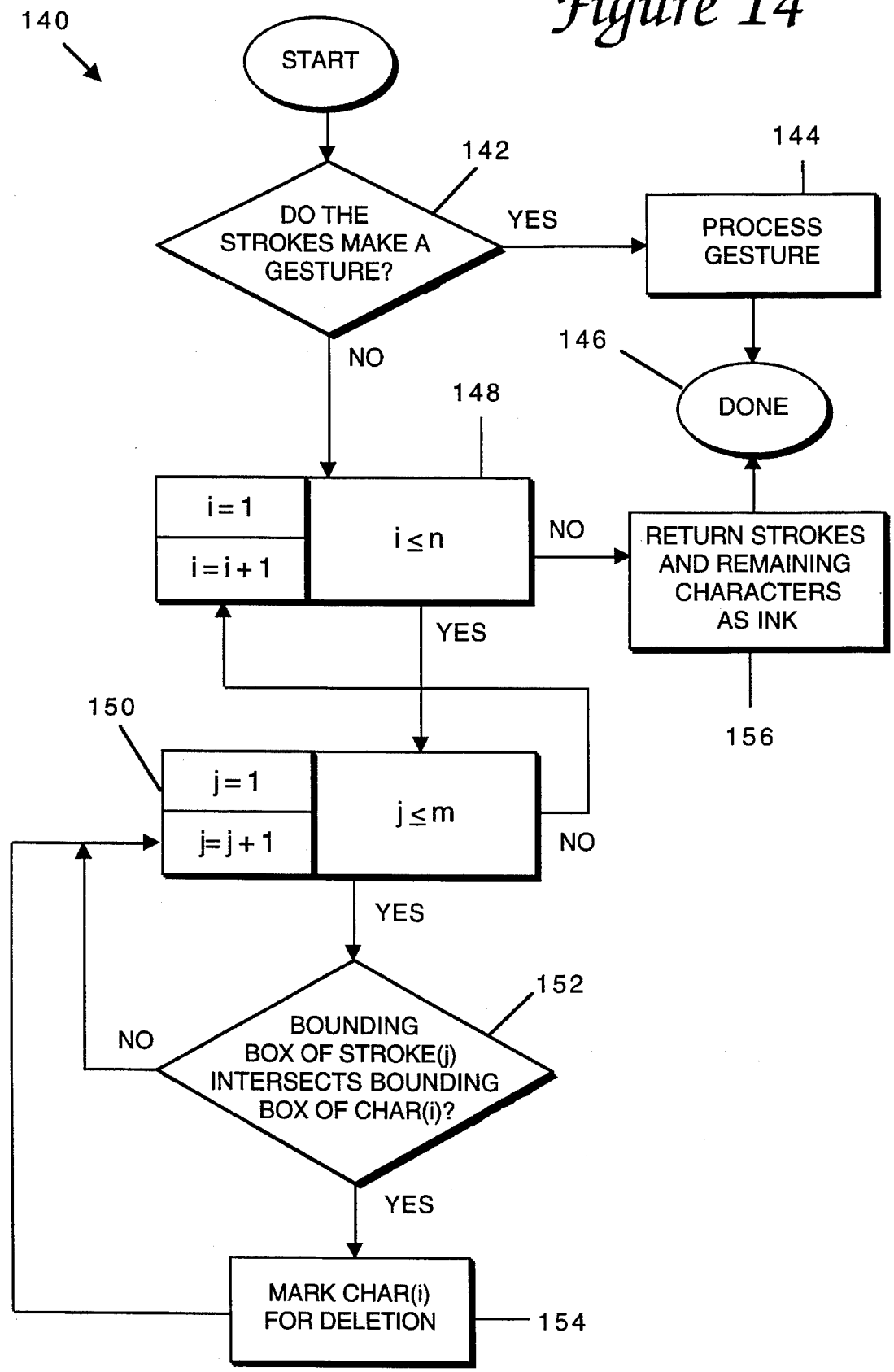
FIG. 14 is a flow diagram illustrating the "Edit Ink Object" step of FIG. 11.

FIG. 14 is a flow diagram 140 of step 108 shown in FIG. 11. In a first step 142, the CPU checks if the new ink strokes form a gesture. To do this, recognition software must preferably analyze the new ink strokes and check against a list of known gestures, the process of which is well known to those skilled in the art. If the new ink strokes are recognized as a gesture, step 144 is implemented, in which the gesture is processed. Processing the gesture is described with reference to FIG. 15. Once the gesture is processed, the process is complete as indicated in step 146.

If the new ink strokes are not recognized as a gesture, the process continues at step 148. In step 148, the variable i is set to increment from one to n, where n is the number of individual characters recognized in ink object 66. In step 150, the variable j is set to increment from one to m, where m is the number of new ink strokes input by the user. In step 152, the CPU checks if the individual bounding box of stroke(j) intersects the bounding box of char(i). If they do not intersect, then the new strokes are not written over a previous character of ink object 66 and j is incremented at step 150 to examine the next new stroke. If they do intersect, step 154 is implemented, in which char(i) is marked for deletion. That is, a new stroke was written over an old character, so the old character is deleted and replaced with the new strokes, as shown in Figures 7a and 7b.

Once all of the strokes and characters have been checked for intersection in steps 148–154, the process continues to step 156. In this step, the CPU sends the edited ink object, which includes the new strokes and the characters of ink object 66 that have not been deleted, to step 90 of FIG. 11, where the new ink object is rerecognized. The characters of ink object 66 that have been marked for deletion are not sent to step 90. If all characters have been marked for deletion, a "null" object is sent to the recognizer to indicate that the entire ink object 66 has been deleted. After step 156, the process is completed as indicated by step 146.

Figure 15:
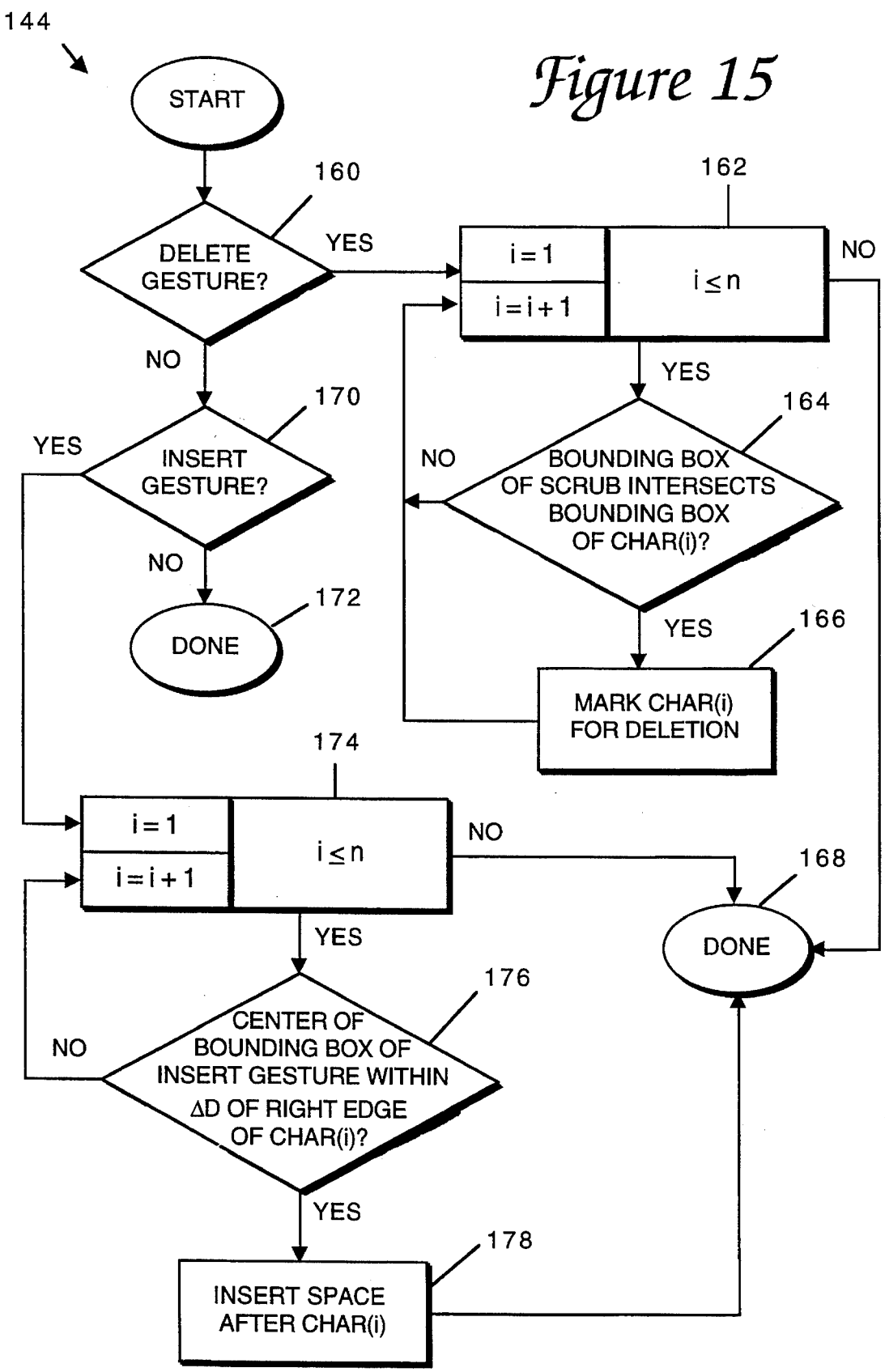
FIG. 15 is a flow diagram illustrating the "Process Gesture" step of FIG. 14.

FIG. 15 is a flow diagram of process gesture step 144 of FIG. 14. In a step 160, the CPU checks if a delete gesture (i.e. scrub gesture) has been entered by the user. If a delete gesture has been entered, the process continues to step 162, wherein the variable i is set to increment from 1 to n, where n is the number of characters recognized in ink object 66. In step 164, the CPU checks if the bounding box of the scrub gesture intersects the bounding box of char(i), the currently examined character. If they do not intersect, the process loops back and increments i at step 162. If the bounding boxes do intersect, char(i) is marked for deletion. Characters that are marked for deletion are not returned as strokes to the recognizer in step 156 of FIG. 14. After char(i) is marked for deletion, i is incremented at step 162 and the bounding box of the next character is similarly compared to the scrub gesture. Once all characters have been examined, the process is complete as indicated in step 168.

If the CPU did not detect a delete gesture in step 160, then step 170 is implemented, in which the CPU checks if an insert gesture (i.e. carat) was entered by the user. If an insert gesture was not entered, the process is complete at step 172. If an insert gesture was entered, the process continues at step 174, in which variable i is set to increment from 1 to n, where n is the number of characters in ink object 66. In step 176, the CPU checks if the center of the bounding box of the insert gesture is within a predetermined distance $\Delta D$ of the right edge of the bounding box of char(i). Distance $\Delta D$ is preferably a relatively small distance so that an insert gesture will accurately insert a space in a location the user intended. If the insert gesture's center is not within $\Delta D$ of the right edge of char(i), the process loops back and increments i at step 174. If the insert gesture's center is within $\Delta D$ of the right edge of char(i), step 178 is implemented, in which a space is inserted after char(i). Once a space has been inserted, the process is complete as indicated in step 168.

Alternatively, other criteria can be used to determine where a space is inserted in ink object 66. A space can be inserted before a character by checking if the center of the bounding box of the insert gesture is within a $\Delta D$ distance of the left edge of a character. Or, the CPU can check if center of the bounding box of the insert gesture is nearer the left edge or the right edge of a character bounding box to determine if a space is inserted before or after that character.

While this invention has been described in terms of several preferred embodiments, there are alterations, permutations, and equivalents which fall within the scope of this invention. It is therefore intended that the following appended claims be interpreted as including all such alterations, permutations, and equivalents as fall within the true spirit and scope of the present invention.

What is claimed is:

1. A method for editing a recognized object on a computer screen comprising: displaying a first recognized object on a computer screen;

displaying a first ink object on said computer screen which was previously recognized as said first recognized object, wherein said first recognized object and said first ink object are displayed concurrently;

editing said first ink object to create a second ink object;

recognizing said second ink object as a second recognized object;

replacing said first recognized object with said second recognized object.

2. A method as recited in claim 1 further comprising the step of moving said first recognized object on said computer screen when displaying said first ink object.

3. A method as recited in claim 1 further comprising a step of selecting said first recognized object for editing and wherein said step of displaying said first ink object is accomplished in response to said step of selecting said first recognized object.

4. A method as recited in claim 3 wherein said step of selecting said first recognized object is accomplished by moving a pointing means within a predetermined distance of said first recognized object.

5. A method as recited in claim 1 wherein said step of editing said first ink object is accomplished with a pointing means.

6. A method as recited in claim 5 wherein said step of editing said first ink object includes deleting at least a portion of said first ink object.

7. A method as recited in claim 5 wherein said first ink object comprises a plurality of characters, and wherein said step of deleting includes entering a gesture to delete at least one character.

8. A method as recited in claim 5 wherein said first ink object comprises a plurality of characters, and wherein said step of editing said first ink object includes inserting space between two adjacent characters.

9. A method as recited in claim 8 wherein said step of inserting space between two adjacent characters is accomplished by entering a space gesture.

10. A method as recited in claim 5 wherein said step of editing said first ink object includes entering new ink over at least a portion of said first ink object to replace said at least a portion of said first ink object with said new ink.

11. A method as recited in claim 12 wherein said step of editing includes entering new ink, wherein said second ink object includes said first ink object and said new ink.

12. A method as recited in claim 5 wherein said step of recognizing said second ink object is accomplished after a delimiter occurs indicating said editing step is complete.

13. A method as recited in claim 12 wherein said delimiter includes a predetermined period of time elapsing after said first ink object is edited.

14. A method as recited in claim 12 wherein said delimiter includes moving a pointing means a predetermined distance from said first ink object.

15. A method as recited in claim 1 wherein said step of replacing said first ink object with said second ink object includes displaying said second ink object in place of said first ink object.

16. A method as recited in claim 1 further comprising displaying said second recognized object in place of said first recognized object.

17. A method for displaying information in a computer system comprising:

displaying a recognized object on a screen of a computer system;

selecting said recognized object; and displaying an original ink object at about its original position and in about its original configuration while simultaneously displaying said recognized object, such that said original ink object can be edited.

18. A method as recited in claim 17 wherein said step of selecting is accomplished with a pointing means.

19. A method as recited in claim 18 wherein said step of selecting said recognized object is accomplished when said pointing means is on said screen and within a predetermined distance of said recognized object within the plane of the screen.

20. A method as recited in claim 19 further comprising a step of editing said ink object to create a new ink object.

21. A method as recited in claim 20 further comprising a step of recognizing said new ink object as a new recognized object.

22. A method as recited in claim 21 further comprising a step of replacing said recognized object with said new recognized object.

23. A method as recited in claim 18 wherein said step of selecting said recognized object is accomplished when said pointing means is proximate to but not touching said screen and within a predetermined distance above said plane of said screen.

24. A method as recited in claim 23 wherein said step of selecting said recognized object includes determining a path of said pointing means.

25. A method as recited in claim 24 wherein said step of selecting said recognized object includes:

collecting a number of points representing said path;

calculating a least squares fit line of said points; and selecting said recognized object when said fit line points towards said recognized object.

26. A computer system comprising:

digital processing means;

memory means coupled to said digital processing means;

screen means coupled to said digital processing means;

pointer means coupled to said digital processing means for entering an ink object into said memory means;

means for recognizing said ink object entered into said memory means and for displaying a recognized object on said screen means;

means for selecting said recognized object; and means for displaying said ink object as entered into said memory means on said screen in a substantially unaltered state while simultaneously displaying said recognized object, such that said original ink object can be edited.

27. A computer system as recited in claim 26 wherein said pointer means is selected from the group comprising stylus, mouse, and trackball pointing devices.

28. A computer system as recited in claim 26 wherein said screen means and said pointer means are parts of a pen computer system.

29. A computer system as recited in claim 28 wherein said means for selecting includes means for detecting said pointer means within a predetermined distance of said recognized object.

30. A computer system as recited in claim 28 further comprising means for editing said ink object.

31. A computer system as recited in claim 30 further comprising means for recognizing said edited ink object as a new recognized object.

32. A computer system as recited in claim 31 further comprising means for replacing said recognized object with said new recognized object.

* * * * *